July 16, 1963

J. F. CERNESS ETAL 3,097,422

SILVER LEAD ALLOY FOR CAVITATION EROSION RESISTANCE

Filed Feb. 25, 1960

INVENTOR.
JOSEPH F. CERNESS
BY BETTY M. LUCE

ATTORNEY

United States Patent Office 3,097,422
Patented July 16, 1963

3,097,422
SILVER LEAD ALLOY FOR CAVITATION
EROSION RESISTANCE
Joseph F. Cerness, East Cleveland, and Betty M. Luce, Willowick, Ohio, assignors to Clevite Corporation, Cleveland, Ohio, a corporation of Ohio
Filed Feb. 25, 1960, Ser. No. 11,102
8 Claims. (Cl. 29—183.5)

This is a continuation in part of application Serial Number 576,206, filed April 4, 1956, now abandoned, in the names of Joseph F. Cerness and Betty M. Luce for Silver-Lead Alloy for Cavitation Erosion Resistance.

This invention pertains to an improved cavitation erosion resistant alloy, and more particularly to an alloy which is also an improved bearing material.

The alloy of this invention achieves its maximum utility when used as a bearing material for use in aircraft engines, but it can be used wherever cavitation resistance is needed, or where a good bearing material is needed.

In the prior art aircraft bearings have been described which are made of an alloy of silver with 1 to 15% lead. See Patent 2,283,219. Also, for a number of years aircraft bearings have been produced which were an alloy of 97.5% silver and 2.5% lead. These bearings have been quite successful but recent engine developments and accessory drives have increased cavitation erosion of the bearings, necessitating the replacement of about 85% of the bearings in some cases after only 1000 hours of service. With the advent of higher gear torques and speeds, the tendency for cavitation in the bearings has increased, and with further technical progress present materials will probably become unsatisfactory.

An object of this invention is to provide a silver-lead alloy with improved cavitation erosion resistance.

It is an object of this invention to provide an improved bearing for aircraft use with the added advantage of superior resistance to cavitation erosion.

For a better understanding of the present invention, together with other and further objects thereof, reference is had to the following description taken in connection with the accompanying drawings, and its scope will be pointed out in the appended claims.

An aspect of this invention is the provision of silver-lead alloy with greatly improved cavitation erosion resistance qualities.

Another aspect of the present invention is the provision of a bearing material or alloy which may be applied substantially directly to a part to form a bearing layer, or which may be applied to a backing member to form a full circle bushing or a sleeve bearing, wherein the alloy material contains lead in an amount less than about .75% and the balance is substantially all silver in order to improve resistance to cavitation erosion.

Figure 1:
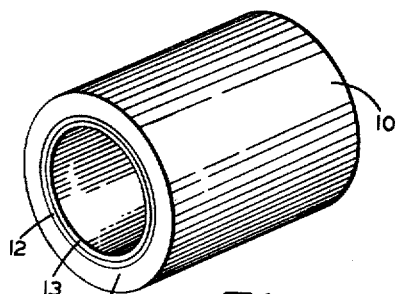
FIGURE 1 is an isometric view of a full circle tri-metal bushing or bearing embodying the invention.

With reference to the drawing there is shown in FIGURE 1 a typical full circle, tri-metal bearing 10 formed of a steel backing member 11 with a relatively thin layer 12 of silver-lead alloy adhered to one of its faces and with a super-imposed run-in overlay layer 13 of lead-indium, lead-tin, or the like, on the silver-lead alloy layer 12.

The silver-lead alloy layer 12 is of the order of .008"–.20" thick and the steel backing member 11 is about .050–.070" thick to stand the stresses and strains incident to aviation use. The run-in layer 13 may be quite thin, on the order of .001".

Figure 2:
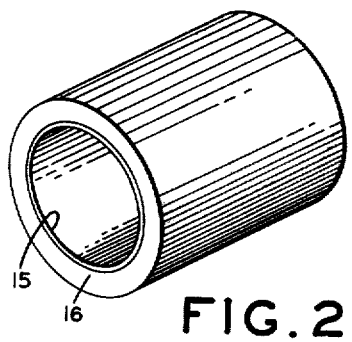
FIGURE 2 is an isometric view of a steel backed bushing or bearing embodying the invention.

FIGURE 2 shows a typical full-circle steel-backed bushing or bearing wherein the silver-lead alloy layer 15 of this invention is applied to the steel backing member 16, the backing member being about .050 to .070" thick and the silver-lead alloy layer being about .008 to .020" thick. Additionally, the alloy of the invention may be applied to sleeves bearings and the like.

Figure 3:
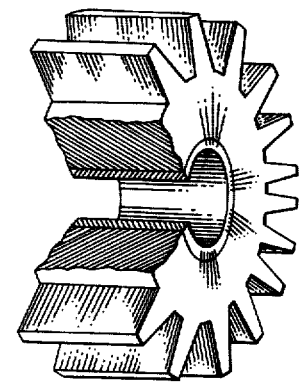
FIGURE 3 is a sectional view of a gear or the like wherein the alloy of the invention is applied to the bore through the gear.

FIGURE 3 shows the alloy of the present invention applied substantially directly to the bore of a gear or the like, thereby saving the space that normally is taken by the steel backing member so that a gear shaft of increased diameter may be used.

While the silver-lead alloy may be plated directly onto the backing member or directly onto the wall of the bore in a part, it is preferable to obtain maximum adhesion by first plating a thin (.001" to .002") layer of substantially pure silver to the backing member or to the wall of the bore and to thereafter plate on the silver-lead alloy of this invention.

It has been known that an amount of lead in excess of about 1% increases the hardness of silver, and it has been generally known that harder bearing materials better withstood cavitation erosion.

The present invention lies in the discovery that silver-lead alloys having lead in an amount less than about .75% and greater than about .15% are far superior in their resistance to cavitation erosion after they have been annealed than silver-lead alloys having amounts of lead greater than about .75%, even though the higher lead content alloys have a higher initial Rockwell hardness. The annealing of the alloy may take place before use of the material, or in the case of the bearing, annealing may be effected by use of the bearing in a hot environment.

The reason for this improvement in the cavitation erosion resistance lies in the fact that when a silver-lead alloy is annealed, its hardness drops very rapidly to an unduly low value if it has more than about .75% lead in the alloy, whereas if it has between about .15 to 75% lead its hardness after annealing is considerably higher than prior art alloys having greater than 1% lead in the silver. The normal operating temperature of today's airplane engines is sufficiently high to anneal the silver-lead alloy bearings during operation, thereby greatly reducing their hardness and making them more vulnerable to subsequent cavitation erosion if the alloy contains more than about .75% lead.

Figure 4:
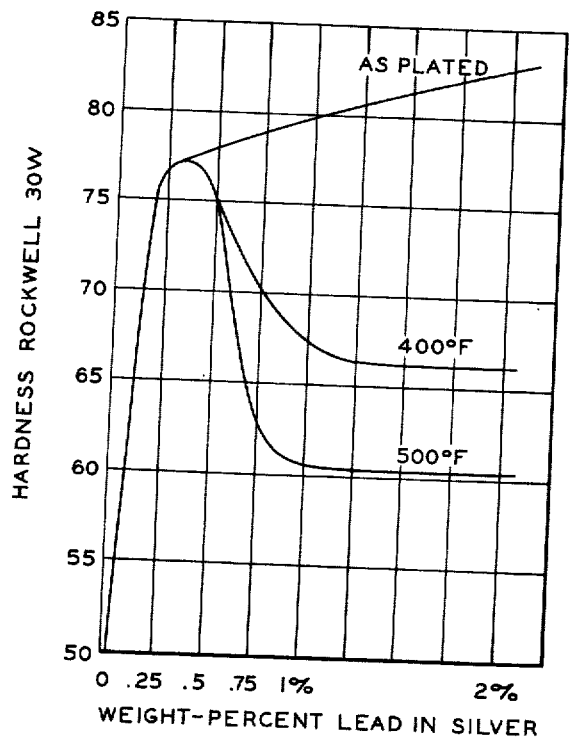
FIGURE 4 is a graph showing the "as plated" and annealed hardness of various silver alloys, including the alloy of this invention, as measured on a Rockwell 30W scale.

It will be seen from FIGURE 4 that the Rockwell hardness of silver-lead alloys, measured on a 30W scale, increases very rapidly with practically trace amounts of lead until a hardness of about 77 is obtained with about .3% lead and that thereafter the increase in hardness with increasing lead is smaller but is quite definite. Any amount of lead above about .15% produces an alloy which is initially sufficiently hard to satisfactorily resist cavitation erosion, but upon being subjected to annealing temperature, either by use or by heat treatment, the hardness of silver alloys having amounts of lead greater than about .75% drops to an undesirably low value. After annealing, silver alloys containing less than about .75% lead have a remaining hardness which is considerably higher than silver alloys having 1% or more lead, even when subjected to annealing temperatures of 500° F. or higher. This improved hardness after annealing also holds true for annealing at 572° F.

Since modern aircraft utilize engines whose temperatures run high enough to anneal silver alloy bearings and soften them, it is apparent that in the past the 2.5% lead 97.5% silver alloy bearings had a Rockwell 30W hardness of only about 60 shortly after they went into service, whereas bearings made in accordance with the present invention will maintain substantially their original high Rockwell hardness even after much service if they have between about .2 and .5% lead in the silver, and if they have between about .5 and .75% their hardness drops some, but they remain considerably harder than prior art silver-lead alloy bearings. Also, from the curve of FIGURE 4, it is apparent that the best silver-lead alloy for resistance to cavitation erosion contains about .35% lead, balance silver.

This invention is primarily applicable to a steel backed bearing with or without an intermediate layer of nickel, copper or silver, but the backing layer may also be aluminum or alloy thereof, or bronze or alloys such as a nickel-bronze alloy. Any strong heat conducting metal to which pure or substantially pure silver can be plated over Ni, Cu or silver falls within the scope of the invention.

Since the alloy of the present invention has such a small amount of lead alloyed with it the techniques for plating it on the backing member are the same as the techniques for plating pure silver. In the event that difficulty is experienced in making the alloy adhere to a given backing material pure silver, copper or nickel can be applied directly to the backing member as an intermediate layer, and the silver-lead alloy of the invention can then be applied to the intermediate layer.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. A bearing comprising a backing member of strong, heat conductive metal and superimposed thereon a relatively thin bearing layer of an alloy comprised of lead in an amount greater than about .15% and less than about .75% and the balance substantially all silver.

2. A bearing as set forth in claim 1, further characterized by said bearing layer being an electroplated alloy layer.

3. A bearing as set forth in claim 1, further characterized by said backing member being selected from the group consisting of steel or aluminum or alloys thereof, or bronze.

4. A bearing as set forth in claim 1, further characterized by said bearing layer being between .008 and .020 inch thick.

5. A bearing as set forth in claim 3, further characterized by an intermediate layer between said backing member and said bearing layer selected from the group consisting of nickel, copper or silver.

6. A bearing comprising a steel backing member coated with an electroplated alloy layer comprising at least about .15% but less than about .75% lead and the balance substantially all silver.

7. A bearing comprising a steel backing member coated with an electroplated alloy layer of lead and silver, the lead content being between about .2 and .5% and the balance substantially all silver.

8. A bearing comprising a steel backing member coated with an electroplated layer of an alloy of lead and silver, the lead content being about .35% and the balance being substantially all silver.

References Cited in the file of this patent

UNITED STATES PATENTS

| | | |
|---|---|---|
| 2,057,604 | Zickrick | Oct. 13, 1936 |
| 2,283,219 | McCullough | May 19, 1942 |
| 2,288,656 | Smart | July 7, 1942 |
| 2,520,310 | Frazier | Aug. 29, 1950 |
| 2,621,988 | Donley | Dec. 16, 1952 |

OTHER REFERENCES

Metals and Alloy, page 1158, title Silver for Bearings, 1942.

Silver for Bearings, in Iron Age, Aug. 13, 1942, by Adolphe Bregman, pages 65–67.

UNITED STATES PATENT OFFICE
CERTIFICATE OF CORRECTION

Patent No. 3,097,422                           July 16, 1963

Joseph F. Cerness et al.

It is hereby certified that error appears in the above numbered patent requiring correction and that the said Letters Patent should read as corrected below.

Column 2, line 4, for ".20"" read -- .020" --.

Signed and sealed this 11th day of February 1964.

(SEAL)
Attest:

ERNEST W. SWIDER
Attesting Officer

EDWIN L. REYNOLDS

Acting Commissioner of Patents